US012758926B2

(12) United States Patent
Kawashima et al.

(10) Patent No.: US 12,758,926 B2

(45) Date of Patent: Oct. 13, 2026

(54) GAS SEPARATION MEMBRANE

(71) Applicant: NITTO DENKO CORPORATION, Osaka (JP)

(72) Inventors: Toshiyuki Kawashima, Osaka (JP); Shunsuke Nomi, Osaka (JP); Yasuyuki Sakakibara, Osaka (JP); Jianhua Fang, Shanghai (CN); Jingqiu Yu, Hubei (CN); Xiaoxia Guo, Shanghai (CN)

(73) Assignee: NITTO DENKO CORPORATION, Osaka (JP)

( * ) Notice: Subject to any disclaimer, the term of this patent is extended or adjusted under 35 U.S.C. 154(b) by 345 days.

(21) Appl. No.: 18/575,980

(22) PCT Filed: May 16, 2022

(86) PCT No.: PCT/JP2022/020333

§ 371 (c)(1),
(2) Date: Jan. 2, 2024

(87) PCT Pub. No.: WO2023/067835

PCT Pub. Date: Apr. 27, 2023

(65) Prior Publication Data

US 2024/0335797 A1 Oct. 10, 2024

(30) Foreign Application Priority Data

Oct. 21, 2021 (JP) ................................ 2021-172533

(51) Int. Cl.
*B01D 53/22* (2006.01)
*B01D 71/64* (2006.01)

(52) U.S. Cl.
CPC ...... *B01D 71/641* (2022.08); *B01D 2257/504* (2013.01); *B01D 2258/06* (2013.01)

(58) Field of Classification Search
CPC ............ B01D 71/641; B01D 2257/504; B01D 2258/06
See application file for complete search history.

(56) References Cited

U.S. PATENT DOCUMENTS 4,880,442 A * 11/1989 Hayes .................... B01D 71/64 95/55
4,954,144 A * 9/1990 Burgoyne, Jr. .... C08G 73/1039 96/14

(Continued)

FOREIGN PATENT DOCUMENTS

CN 108043232 A 5/2018
EP 0 750 393 A2 1/1997

(Continued)

OTHER PUBLICATIONS

Search Report issued in EP Patent Application No. 22883148.3, Sep. 15, 2025.

(Continued)

*Primary Examiner* — Anthony Shumate
(74) *Attorney, Agent, or Firm* — GREENBLUM & BERNSTEIN, P.L.C.

(57) ABSTRACT

An object of the present invention is to provide a gas separation membrane containing a novel sulfonated polyimide and having superior gas separation performance. The gas separation membrane of the present invention contains a sulfonated polyimide represented by the following general formula (1):

(Continued)

[Formula 1]

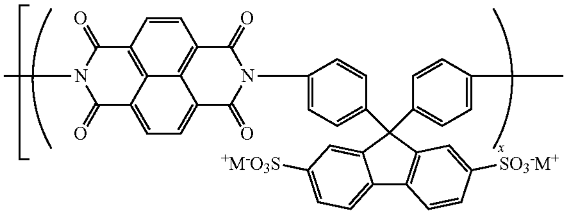

(1)

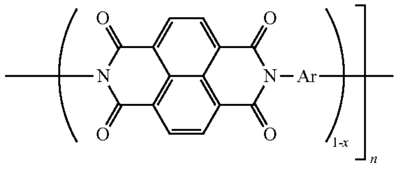

wherein Ar is an aryl group, X is more than 0 and 1 or less, and $M^+$ is $H^+$ or a metal cation.

3 Claims, 3 Drawing Sheets

(56) References Cited

U.S. PATENT DOCUMENTS

| | | | | |
|---|---|---|---|---|
| 5,178,650 A * | 1/1993 | Hayes | B01D 71/64 | 95/47 |
| 5,234,471 A * | 8/1993 | Weinberg | C08G 73/1042 | 95/52 |
| 5,248,319 A * | 9/1993 | Ekiner | B01D 71/641 | 95/55 |
| 5,322,549 A * | 6/1994 | Hayes | B01D 71/64 | 210/500.39 |
| 5,618,334 A | 4/1997 | Ozcayir et al. | | |
| 5,716,430 A * | 2/1998 | Simmons | C08G 73/10 | 210/500.39 |
| 5,725,633 A * | 3/1998 | Ozcayir | C08G 73/1042 | 96/13 |
| 2010/0288701 A1* | 11/2010 | Zhou | B01D 71/62 | 96/9 |
| 2013/0288156 A1* | 10/2013 | Sugitani | H01B 1/122 | 528/172 |
| 2015/0328594 A1* | 11/2015 | Liskey | B01D 53/22 | 585/818 |
| 2020/0368678 A1* | 11/2020 | Choi | B01D 71/68 | |
| 2022/0213282 A1* | 7/2022 | Fang | C08G 73/105 | |
| 2022/0219127 A1* | 7/2022 | Hayek | C08G 73/1085 | |
| 2023/0182084 A1* | 6/2023 | Kawashima | B01D 69/12 | 210/500.38 |
| 2025/0099919 A1* | 3/2025 | Kawashima | B01D 69/10 | |

FOREIGN PATENT DOCUMENTS

| | | | |
|---|---|---|---|
| EP | 0750939 A2 * | 1/1997 | B01D 71/64 |
| JP | 2003-064181 A | 3/2003 | |
| JP | 2003-236352 A | 8/2003 | |
| JP | 2003-277501 A | 10/2003 | |
| JP | 2005-270817 A | 10/2005 | |
| JP | 2005-272666 A | 10/2005 | |
| JP | 2012-521873 A | 9/2012 | |
| JP | 2013-229121 A | 11/2013 | |
| WO | 2010/110995 A2 | 9/2010 | |

OTHER PUBLICATIONS

Xiaoxia Guo et al.: "Novel Sulfonated Polyimides as Polyelectrolytes for Fuel Cell Application. 2. Synthesis and Proton Conductivity of Polyimides from 9,9-Bis(4-aminophenyl)fluorene-2,7-disulfonic Acid", Macromolecules, vol. 35, No. 17, Aug. 1, 2002 (Aug. 1, 2002), pp. 6707-6713, XP055134332, ISSN: 0024-9297, DOI: 10.1021/ma020260w.

Watari T et al.: "Synthesis, water stability and proton conductivity of novel sulfonated polyimides from 4,4'-bis(4-aminophenoxy)biphenyl-3,3'-disulfonic acid", Journal of Membrane Science,, vol. 230, No. 1-2, Feb. 15, 2004 (Feb. 15, 2004), pp. 111-120, XP004486498, DOI: 10.1016/J.MEMSCI.2003.10.037.

Zhou Weiliang et al.: "Gas Permeation Properties of Flexible Pyrolytic Membranes from sulfonated Polyimides", Chemistry Letters, [Online] vol. 31, No. 5, May 1, 2002 (May 1, 2002), pp. 534-535, XP093305603, ISSN: 0366-7022, DOI: 10.1246/cl.2002.534.

Islam et al.: "Preparation and gas separation performance of flexible pyrolytic membranes by low-temperature pyrolysis of sulfonated polyimides", Journal of Membrane Science, [Online] vol. 261, No. 1-2, Sep. 15, 2005 (Sep. 15, 2005), pp. 17-26, XP005043832.

IPRP issued in INTERNATIONAL Application No. PCT/JP2022/020333, mailed May 2, 2024.

Lloyd M. Robeson, "The upper bound revisited", Journal of Membrane Science, 2008, 320, pp. 390-400.

Hongyong Fu et al., "Studies on the Sulfonation of Poly (phenylene oxide) (PPO) and Permeation Behavior of Gases and Water Vapor Through Sulfonated PPO Membrane. II. Permeation Behavior of Gases and Water Vapor Through Sulfonated PPO Membranes", Journal of Applied Polymer Science, 1994, vol. 51, pp. 1405-1409.

Youn Kook Kim et al., "Carbon molecular sieve membranes derived from metal-substituted sulfonated polyimide and their gas separation properties", Journal of Membrane Science, 2003, 226, pp. 145-158.

Kazuhiro Tanaka et al., "Gas permeation and separation properties of sulfonated polyimide membranes", ScienceDirect; Polymer, May 31, 2006, vol. 47, Issue 12, pp. 4370-4377.

ISR issued in International Patent Application No. PCT/JP2022/020333, Jun. 28, 2022, translation.

Office Action issued in JP Patent Application No. 2023-554242, Apr. 8, 2026, translation.

Office Action issued in EP Patent Application No. 22883148.3, Jun. 26, 2026.

Piroux et al., "Sulfonated copolyimides: influence of structural parameters on gas separation properties", Desalination 145, No. 3, Sep. 10, 2002, pp. 371-374 DOI: 10.1016/S0011-9164(02)00438-1.

Office Action issued in CN Patent Application No. 202280060804.3, Aug. 25, 2026, translation.

* cited by examiner

[Figure 1]
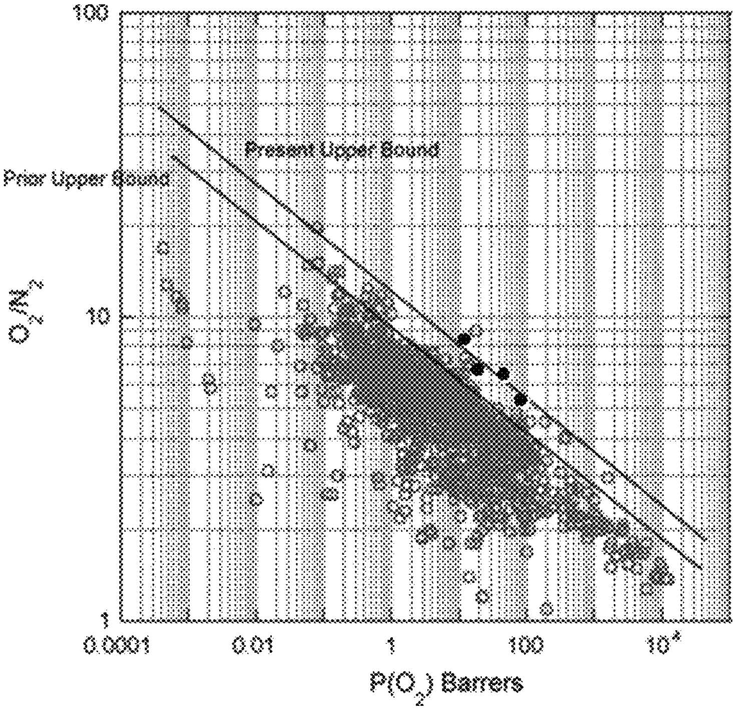
[Figure2]
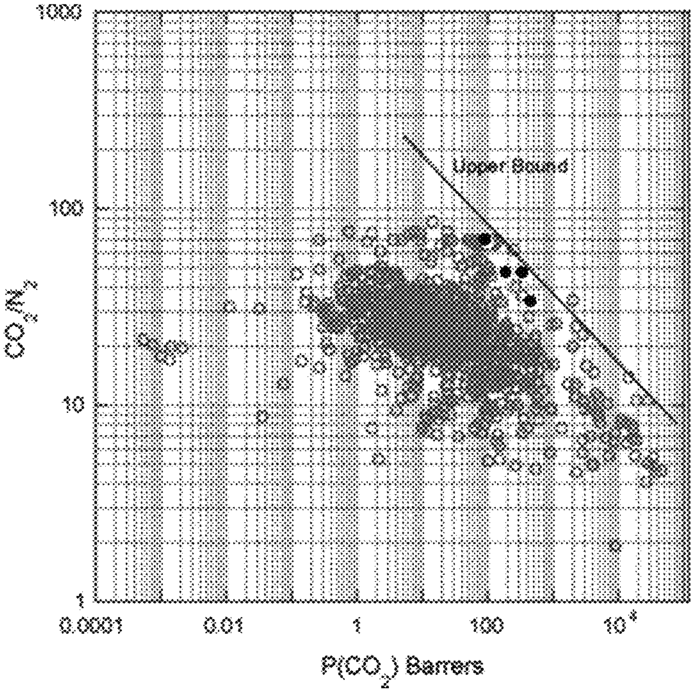

[Figure3]
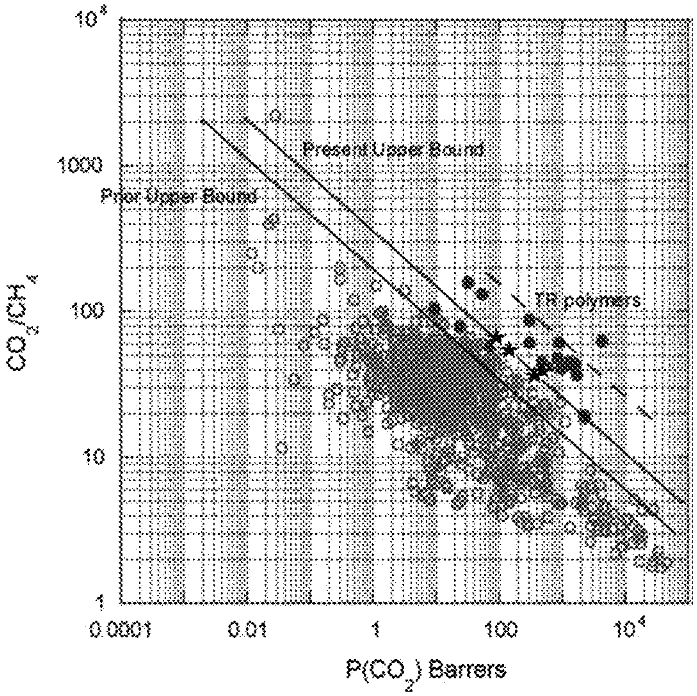
[Figure4]
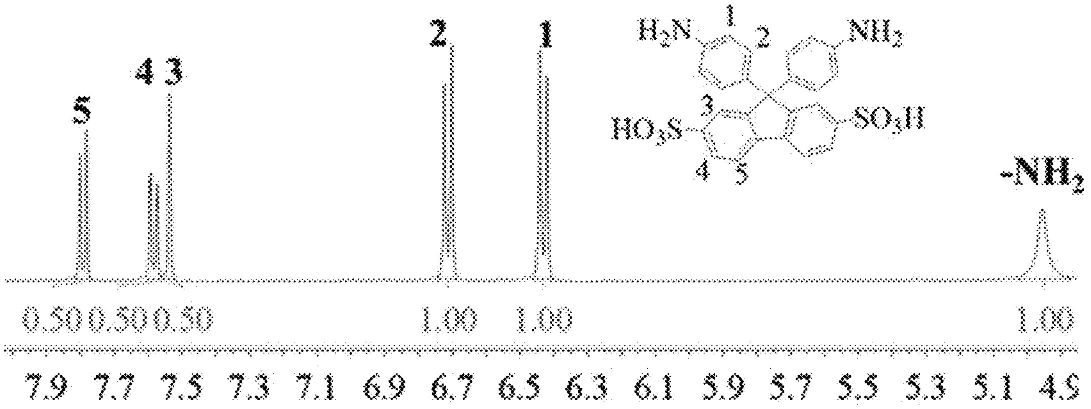

[Figure5]
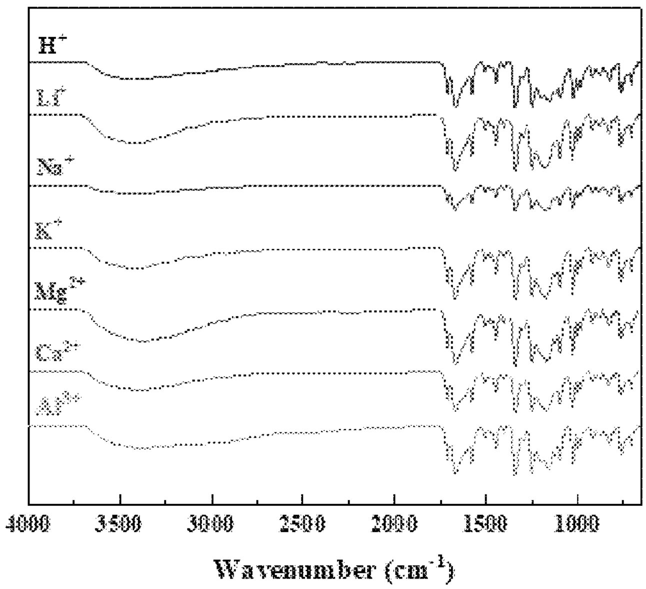

GAS SEPARATION MEMBRANE

TECHNICAL FIELD

The present invention relates to a high-performance gas separation membrane containing a novel sulfonated polyimide.

BACKGROUND ART

At present, fossil fuels are still a major energy resource, and it is recognized that $CO_2$ emissions due to combustion of fossil fuels are the main cause of current global warming. An effective way to reduce the impact of $CO_2$ emissions on climate is to recover $CO_2$ and then convert it into a useful compound, such as methanol. The recovery of $CO_2$ can be realized by many methods such as the use of an amine-based solvent and pressure swing adsorption (PSA), but gas separation using a separation membrane is the most effective method because it has many advantages such as low energy consumption, low capital investment cost, and simple and easy operation. In addition to $CO_2$ recovery, other industrial applications of gas separation techniques using separation membranes have also been found, such as generation of nitrogen, concentration of oxygen from air, removal of $CO_2$ from natural gas, recovery of hydrogen from ammonia purged steam, and olefin-paraffin separation.

Membrane separation performance is essentially determined by the membrane material itself. During the past several decades, many materials such as zeolites, polymers, metal-organic frameworks (MOFs), and hybrid materials have been extensively studied for gas separation applications. Among them, aromatic polyimide, which is a type of aromatic heterocyclic polymer, is the most attractive membrane material due to its superior heat resistance, high mechanical strength and high elastic modulus, superior film forming ability, and superior chemical resistance. Some polyimide membranes have been commercialized for gas separation applications.

The permeability coefficient and the permeation selectivity are two important parameters for evaluating gas separation performance. The development of membranes with both high permeability coefficients and high permeation selectivity is always the most important research subject in this field. However, a trade-off problem generally exists. That is, a membrane having a high gas permeability coefficient tends to have low permeation selectivity, and vice versa. Robeson reported the first empirical upper limit relationship for the membrane separation of gases in 1991 and a revised version in 2008 (Non-Patent Document 1). The main challenge is to develop new membranes with separation performance above the upper limit.

Polyimides are generally synthesized via a two-step reaction from a dianhydride and a diamine monomer. The relationship between polyimide structure and gas separation performance has been well studied over the past several decades. A new dianhydride and/or a new diamine monomer are often required to obtain high gas separation performance, and their synthesis involves complex reaction procedures. It is highly desirable to develop an easy approach that can significantly improve gas separation performance without the need for complex synthesis procedures of monomers.

Incorporating strong polar groups such as sulfonic acid groups has been confirmed to be an effective method of enhancing the gas separation performance (usually selectivity) of membranes of many types of polymers such as poly(phenylene oxide), poly(ether sulfone), and poly(ether ketone). For example, H. Fu et al. report that sulfonation of poly(phenylene oxide) increased the selectivity of $O_2/N_2$ and the increase has reached 50%, whereas the oxygen permeability coefficient decreased to 1/(7 to 8) when the percentage of sulfonation reached 37% (Non-Patent Document 2).

Sulfonated polyimides have been extensively studied for fuel cell applications for the past several decades. However, very few sulfonated polyimide membranes have been studied for gas separation. Young Moo Lee et al. report that a 5-membered sulfonated polyimide membrane synthesized from 3,3',4,4'-benzophenone tetracarboxylic dianhydride, 2,2'-benzidine disulfonic acid, and m-phenylenediamine showed very high selectivity for a pair of $O_2/N_2$ and $He/N_2$ gases in a proton form, but the permeability coefficients of oxygen and helium were very low, and further report that the selectivity is significantly reduced when the membrane is converted into a metal cation form ($Li^+$, $Na^+$ and $K^+$) (Non-Patent Document 3). K. Tanaka et al. report that a 6-membered sulfonated polyimide membrane synthesized from 1,4,5,8-naphthalenetetracarboxylic dianhydride and 2,2-bis(4-(4-aminophenoxy)-3-sulfophenyl) hexafluoropropane has a selectivity of 36 for $CO_2/N_2$, but the $CO_2$ permeability coefficient of the membrane is rather low (Non-Patent Document 4).

PRIOR ART DOCUMENTS

Non-Patent Documents

Non-Patent Document 1: L. M. Robeson, The upper bound revisited, J. Membr. Sci. 320 (2008) 390-400

Non-Patent Document 2: H. Fu et al., J. Appl. Polym. Sci. 51 (1994) 1405-1409

Non-Patent Document 3: Y. K. Kim et al., J. Membr. Sci. 226 (2003) 145-158

Non-Patent Document 4: K. Tanaka et al., Polymer 47 (2006) 4370-4377

SUMMARY OF THE INVENTION

Problems to be Solved by the Invention

An object of the present invention is to provide a gas separation membrane containing a novel sulfonated polyimide and having superior gas separation performance.

Means for Solving the Problems

The present invention relates to a gas separation membrane comprising a sulfonated polyimide represented by the following general formula (1):

[Formula 1]

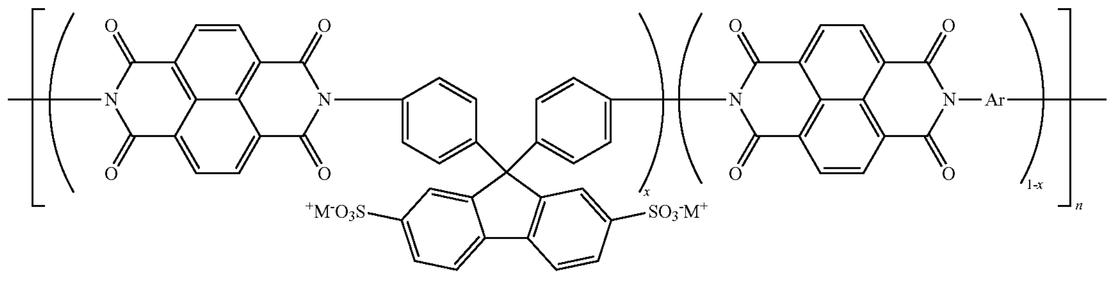

(1)

wherein Ar is an aryl group, X is more than 0 and 1 or less, and $M^+$ is $H^+$ or a metal cation.

The aryl group is preferably one or more aryl groups represented by the following chemical formulas (2) to (7).

[Formula 2]

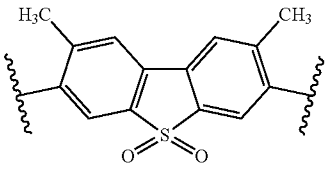

(2)

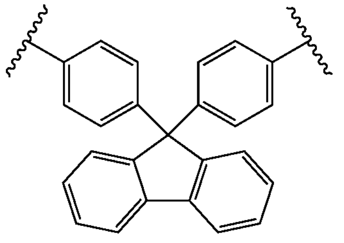

(3)

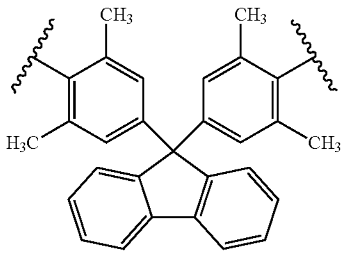

(4)

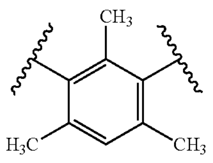

(5)

-continued

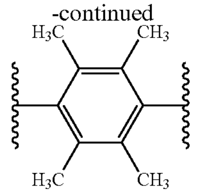

(6)

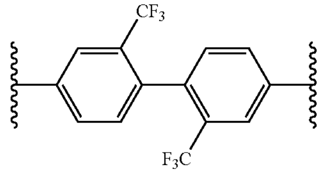

(7)

The metal cation is preferably a mono- to tri-valent metal cation.

Effect of the Invention

The gas separation membrane (sulfonated polyimide membrane) of the present invention comprises a sulfonated polyimide having a specific chemical structure, and has superior gas separation performance. In addition, gas separation performance can be easily improved by introducing a metal cation into a sulfonic acid group by cation-exchange treatment.

The gas separation membrane (sulfonated polyimide membrane) of the present invention has superior separation performance in generation of nitrogen or concentration of oxygen from various gas mixtures, especially air, recovery of $CO_2$ from flue gas, and removal of $CO_2$ from natural gas.

The sulfonated polyimide of the present invention has the following characteristics.

1) The sulfonated polyimide has a highly rigid polymer backbone that ensures a high gas permeability coefficient due to a high volume fraction.

2) In a multivalent cation type, such as $Al^{3+}$, a membrane of the sulfonated polyimide has an improved gas permeability because the unique polymer chain packing inducing ion interaction can provide a special volume fraction.

3) The sulfonated polyimide affords high selectivity for a gas pair of $CO_2/N_2$ and a gas pair of $CO_2/CH_4$ because a sulfonic acid group has high affinity for $CO_2$ but has little affinity for nitrogen or methane.

4) Superior anti-plasticization and anti-aging performance of a membrane of the sulfonated polyimide are ensured due to strong interchain interaction caused by a highly polar sulfonate anion and a metal counter ion.

5) In a di- or trivalent metal cation type, the anti-plasticization and anti-aging performance are further enhanced by the presence of ionic crosslinks. As a result, sulfonated polyimide membranes exhibit superior gas separation performance approaching or exceeding the upper limit raised by Robeson in 2008.

BRIEF DESCRIPTION OF THE DRAWINGS

FIG. 1 is a graph showing a comparison of $O_2/N_2$ separation performance between several selected sulfonated polyimide membranes of the present invention (closed black circles) and the membrane proposed by Robeson in 2008 (L. M. Robeson, The upper bound revisited, J. Membr. Sci. 320 (2008) 390-400).

FIG. 2 is a graph showing a comparison of $CO_2/N_2$ separation performance between several selected sulfonated polyimide membranes of the present invention (closed black circles) and the membrane proposed by Robeson in 2008 (L. M. Robeson, The upper bound revisited, J. Membr. Sci. 320 (2008) 390-400).

FIG. 3 is a graph showing a comparison of $CO_2/CH_4$ separation performance between several selected sulfonated polyimide membranes of the present invention (closed black circles) and the membrane proposed by Robeson in 2008 (L. M. Robeson, The upper bound revisited, J. Membr. Sci. 320 (2008) 390-400).

FIG. 4 is a 1H NMR spectrum of BAPFDS synthesized in Example 1.

FIG. 5 shows FT-IR spectra of SPI-1 membranes of the present invention in various cation forms ($H^+$, $Li^+$, $Na^+$, $K^+$, $Mg^{2+}$, $Ca^{2+}$, and $Al^{3+}$).

MODE FOR CARRYING OUT THE INVENTION

Hereinafter, embodiments of the present invention will be described.

<Gas Separation Membrane>

The gas separation membrane of the present invention contains a sulfonated polyimide represented by the following general formula (1):

[Formula 3]

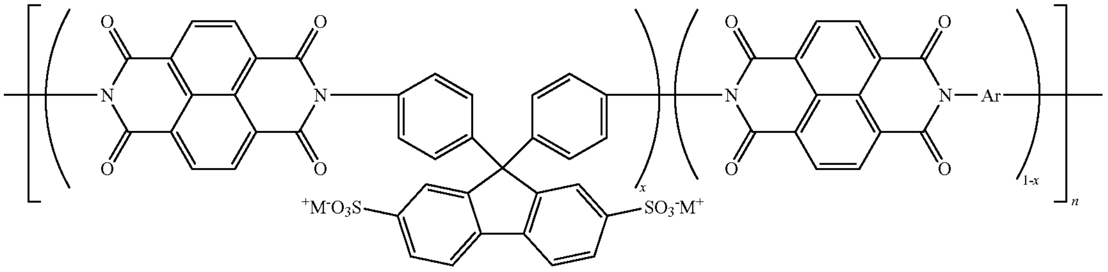

(1)

wherein Ar is an aryl group, X is more than 0 and 1 or less, and $M^+$ is $H^+$ or a metal cation.

The aryl group is not particularly limited, but is preferably one or more aryl groups represented by the following chemical formulas (2) to (7).

[Formula 4]

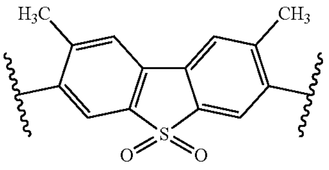

(2)

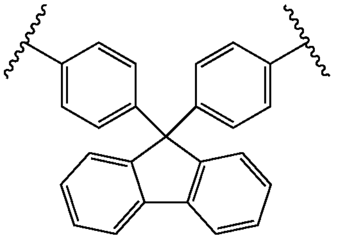

(3)

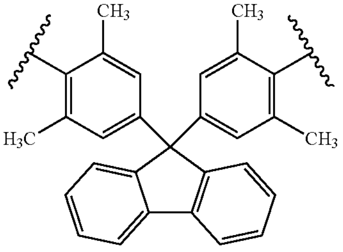

(4)

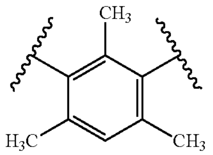

(5)

-continued

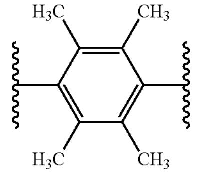

(6)

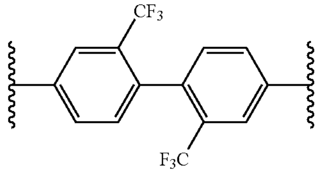

(7)

The metal cation is not particularly limited, but is preferably a mono- to tri-valent metal cation, more preferably a divalent or trivalent metal cation, and still more preferably a trivalent metal cation. Examples of the monovalent metal cation include $Li^+$, $Na^+$, and $K^+$. Examples of the divalent metal cation include $Mg^{2+}$, $Ca^{2+}$, and $Zn^{2+}$. Examples of the trivalent metal cation include $Al^{3+}$ and $Fe^{3+}$.

<Synthesis of Monomer>

Both the dianhydride and the non-sulfonated diamine monomer are commercially available products, but the sulfonated diamine can be easily synthesized from 9,9-bis(4-aminophenyl) fluorene, which is a commercially available diamine monomer, via a one-step reaction (sulfonation). By using these, scale-up production of the sulfonated polyimide of the present invention is facilitated.

The sulfonated diamine 9,9-bis(4-aminophenyl) fluorene-2,7-disulfonic acid (BAPFDS) can be synthesized by modifying the method described in a document (X. Guo et al., Macromolecules 2002, 35, 6707-6713). One example of the sulfonation reaction is shown below.

[Formula 5]

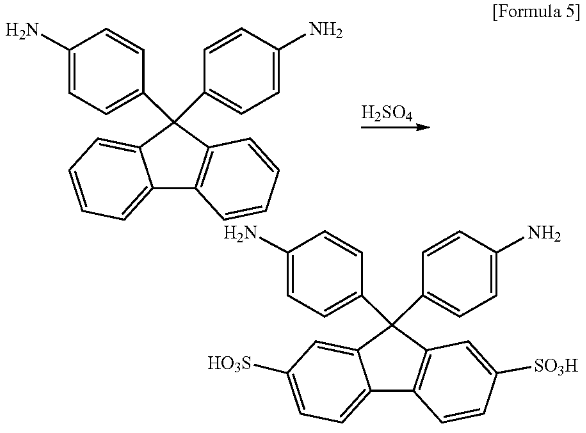

The detailed synthesis procedure is as follows. To a dry four-necked flask equipped with a mechanical stirrer, a nitrogen inlet and a nitrogen outlet were added 9,9-bis(4-aminophenyl) fluorene and concentrated sulfuric acid. The mixture was mechanically stirred at room temperature until the solid was completely dissolved. The reaction mixture was heated at 80 to 150° C. and maintained at this temperature for 1 to 20 hours. After cooling to room temperature, the reaction mixture was poured into ice water. The resulting precipitate was collected by filtration, redissolved in an aqueous sodium hydroxide solution, and then filtered again to make insoluble impurities to be removed. The filtrate was acidified and the precipitate was collected by filtration, washed thoroughly with deionized water, and finally dried in vacuum at 120° C. for 10 hours. The concentration of 9,9-bis(4-aminophenyl) fluorene was controlled in the range of 5 to 80 w/v %. Concentrated sulfuric acid is defined as having a sulfuric acid content greater than 95%.

<Synthesis of Sulfonated Polyimide>

The sulfonated polyimide was synthesized by a conventional one-step high-temperature polymerization method. One specific example of the polymerization reaction is shown below.

[Formula 6]

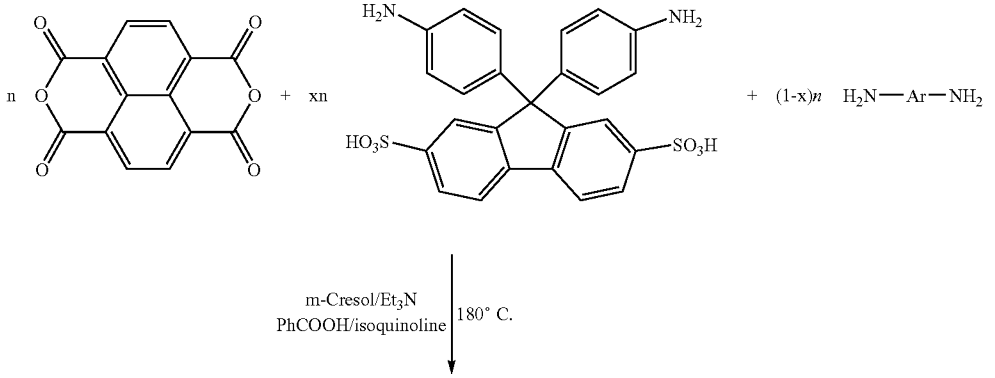

-continued

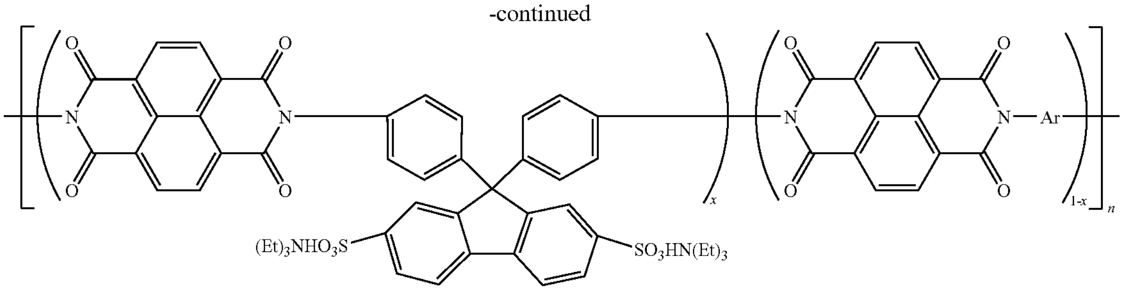

$(0 < x \leq 1)$

Ar =

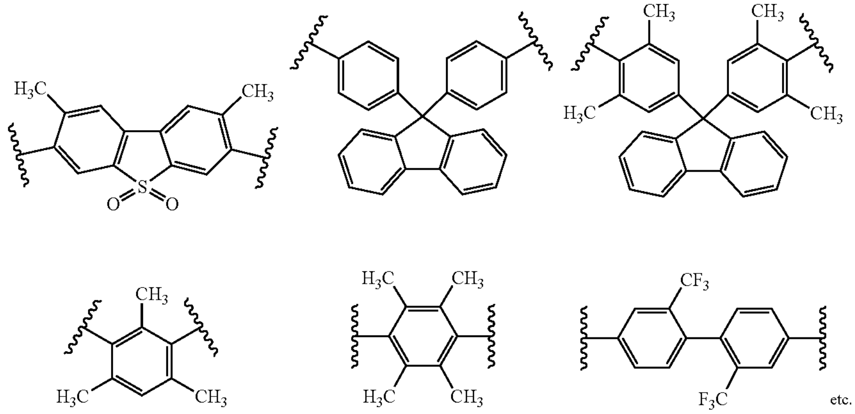

etc.

The detailed polymerization procedure is as follows. To a dry three-necked flask equipped with a magnetic stirrer, a nitrogen inlet, a nitrogen outlet, and a condenser were added a sulfonated diamine BAPEDS, an organic solvent, and an organic base under a stream of nitrogen. The mixture was stirred to completely dissolve the solid. Next, a non-sulfonated diamine, 1,4,5,8-naphthalenetetracarboxylic dianhydride (NTDA), and benzoic acid were added to the flask and the reaction mixture was stirred at room temperature for 30 minutes, and subsequently heated at 80° C. for 1 to 6 hours and at 180° C. for 1 to 10 hours continuously. The reaction mixture was cooled to room temperature and then isoquinoline was added. The reaction mixture was again heated at 180° C. for additional 2 to 10 hours. After cooling to room temperature, the highly viscous polymer solution was poured into methanol. The resulting fibrous precipitate was collected by filtration, washed thoroughly with methanol and dried in vacuo, affording a sulfonated polyimide in a triethylammonium salt form.

The non-sulfonated diamine is preferably 2,4,6-trimethyl-1,3-phenylenediamine (TrMPD), 2,3,5,6-tetramethyl-1,4-phenylenediamine (TeMPD), 2,2'-bis(trifluoromethyl)benzidine (BTFBz), 3,7-diamino-2,8-dimethyldibenzothiophene sulfone (DDBT), 9,9-bis(4-aminophenyl) fluorene (BAPF), or 9,9-bis(4-amino-3,5-dimethylphenyl) fluorene (BADMPF) shown below.

[Formula 7]

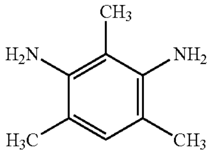

TrMPD

-continued

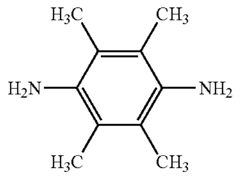

TeMPD

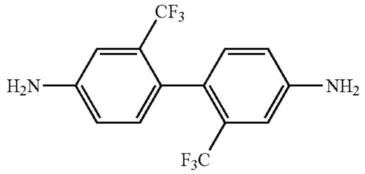

BTFBz

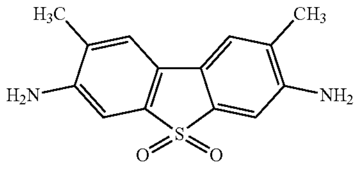

DDBT

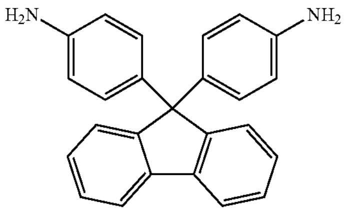

BAPF

-continued

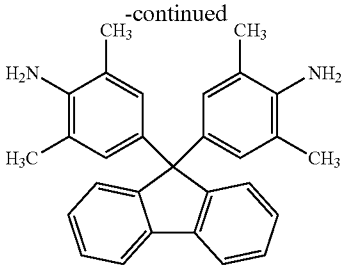

BADMPF

Examples of the organic solvent include, but are not limited to, m-cresol and p-chlorophenol. Examples of the organic base include, but are not limited to, triethylamine and pyridine. The molar ratio of the dianhydride (NTDA) to all diamines (BAPFDS+non-sulfonated diamine) is preferably controlled to 1:1, and the molar fraction of the sulfonated diamine BAPFDS in all diamines x is in the range of $0<x\leq 1$. The total monomer concentration is preferably controlled to 8 to 30 w/v %. The molar ratio of the organic base to BAPFDS is preferably controlled to 2 to 3:1. The molar ratio of benzoic acid to NTDA is preferably controlled to 0.5 to 3:1. The molar ratio of isoquinoline to NTDA is preferably controlled to 0.5 to 3:1.

<Solubility of Sulfonated Polyimide>

The sulfonated polyimide of the present invention is well dissolved in many organic solvents such as m-cresol, 1-methylpyrrolidone (NMP), N,N-dimethylacetamide (DMAc), and dimethyl sulfoxide (DMSO).

<Formation of Sulfonated Polyimide Membrane>

The sulfonated polyimide membrane can be formed, for example, by the following method. The sulfonated polyimide is dissolved in a suitable organic solvent to afford a homogeneous solution having a concentration of 5% or less. The resulting polymer solution is cast on a glass plate and heated at 60 to 150° C. for 0.5 to 10 hours, and thus the organic solvent is evaporated. The as-cast film is peeled off from the glass plate and immersed in a suitable non-solvent, whereby the remaining cast solvent is completely removed, and finally the film is dried at room temperature or an elevated temperature up to 150° C. The resulting sulfonated polyimide membrane is in a triethylammonium salt form. Examples of the "suitable organic solvent" include m-cresol, 1-methylpyrrolidone (NMP), N,N-dimethylacetamide (DMAc), N,N-dimethylformamide (DMF), and dimethyl sulfoxide (DMSO). The "non-solvent" is a liquid in which the sulfonated polyimide is insoluble, and examples thereof include methanol, ethanol, 1-propanol, isopropanol, acetone, and ethyl acetate.

<Proton Exchange>

A sulfonated polyimide membrane in a triethylammonium salt form is converted completely into a proton form by immersing the membrane in hydrochloric acid or an aqueous sulfuric acid solution at room temperature or at an elevated temperature up to 90° C. for a sufficiently long time (usually 5 to 48 hours). The sulfonated polyimide membrane is taken out and washed thoroughly with deionized water, whereby a trace amount of the residual free acid is removed. The sulfonated polyimide membrane is dried at room temperature or an elevated temperature up to 150° C. for a certain period of time (usually 1 to 24 hours). The concentration of hydrochloric acid or a sulfuric acid solution is variable, and preferably in the range of 0.01 to 1.0 M.

<Metal Cation Exchange>

The sulfonated polyimide membrane in a proton form is immersed in an aqueous solution of a selected salt at room temperature for a sufficiently long time (typically 1 to 48 hours), whereby the sulfonated polyimide membrane is thoroughly converted into a metal cation form. The sulfonated polyimide membrane is taken out and washed thoroughly with deionized water, whereby a trace amount of the residual free salt is removed. The sulfonated polyimide membrane is dried at room temperature or an elevated temperature up to 150° C. for a certain period of time (usually 1 to 24 hours). Examples of the salt include, but are not limited thereto, LiCl, NaCl, KCl, $AgNO_3$, $MgCl_2$, $CaCl_2$, $BaCl_2$, $NiCl_2$, $ZnCl_2$, $CuCl_2$, $Pb(NO_3)_2$, $Al(NO_3)_3$, and $Fe_2$ $(SO_4)_3$. The concentration of the aqueous salt solution is variable, and preferably in the range of 0.01 to 1.0 M.

<Shape of Gas Separation Membrane>

The gas separation membrane of the present invention is not limited in its shape at all. That is, any conceivable membrane shape such as a flat membrane shape, a cylindrical shape or a spiral element shape is employable.

<Gas Permeation Test>

A pure gas permeation test was carried out using a GTR-1 ADFE gas sorption coefficient and diffusion coefficient tester (Japan) at 35° C. in the upstream pressure range of 0.1 to 0.5 MPa. The measurement was based on the vacuum time-lag method, and the gas permeability coefficient (P) was determined from the flux in a steady state in a period of 5 to 10 times the time lag (θ). The effective membrane area was 15.2 $cm^2$.

<Gas Separation Performance>

FIGS. 1 to 3 are graphs showing a comparison of $O_2/N_2$, $CO_2/N_2$, and $CO_2/CH_4$ separation performances of several selected gas separation membranes (sulfonated polyimide membranes) of the present invention with the membrane proposed by Robeson in 2008 (L. M. Robeson, The upper bound revisited, J. Membr. Sci., 320 (2008) 390-400). It can be seen that the gas separation membrane of the present invention has superior gas separation performance approaching or exceeding the upper limit of the membrane proposed by Robeson in 2008.

EXAMPLES

Hereinafter, the present invention will be described with reference to Examples, but the present invention is not limited to these Examples.

Example 1

Synthesis of 9,9-bis(4-aminophenyl) fluorene-2,7-disulfonic acid (BAPFDS)

To a 500 mL dry four-necked flask equipped with a mechanical stirrer, a nitrogen inlet and a nitrogen outlet were added 50 g of 9,9-bis(4-aminophenyl) fluorene and 200 mL of concentrated sulfuric acid. The mixture was mechanically stirred at room temperature until the solid was completely dissolved. The reaction mixture was heated at 100° C. and maintained at this temperature for 5 hours. After cooling to room temperature, the reaction mixture was poured into 2 kg of ice water. The resulting precipitate was collected by filtration, redissolved in an aqueous sodium hydroxide solution, and then filtered again to make insoluble impurities to be removed. The filtrate was acidified and the precipitate was collected by filtration, washed thoroughly with deionized water, and finally dried in vacuum at 120° C. for 10 hours, affording 66.4 g of a red brick colored solid product (yield: 91%). The $^1H$ NMR spectrum of the product BAPFDS is shown in FIG. 4. In DMSO-d6, a small amount of triethylamine was added in order to dissolve the product. The result of peak assignment is consistent with the chemical structure of the product.

Example 2

Synthesis of sulfonated polyimide (SPI-1) in triethylammonium salt form

SPI-1 was synthesized by random condensation polymerization of 1,4,5,8-naphthalenetetracarboxylic dianhydride (NTDA), BAPFDS synthesized in Example 1, and 3,7-diamino-2,8-dimethyldibenzothiophene sulfone (DDBT). The molar ratio of BAPFDS to DDBT was controlled to 1:1. The detailed synthesis procedure is as follows.

To a 100 mL dry 3-necked flask equipped with a magnetic stirrer, a nitrogen inlet, a nitrogen outlet, and a condenser were added 1.016 g (2 mmol) of BAPFDS, 18 mL of m-cresol, and 0.65 mL of triethylamine under a stream of nitrogen. The mixture was stirred to completely dissolve the solid. Next, 0.5487 g (2 mmol) of DDBT, 1.073 g (4 mmol) of NTDA and 0.976 g of benzoic acid were added to the flask, and the reaction mixture was stirred at room temperature for 30 minutes, and subsequently heated at 80° C. for 4 hours and further at 180° C. for 5 hours continuously. The reaction mixture was cooled to room temperature, and then 1.032 g of isoquinoline was added. The reaction mixture was again heated at 180° C. for additional 10 hours. After cooling to room temperature, the highly viscous polymer solution was diluted with 5 mL of m-cresol and then poured into methanol. The resulting fibrous precipitate was collected by filtration, washed thoroughly with methanol, and dried in vacuo, affording a sulfonated polyimide (SPI-1) in a triethylammonium salt form. The viscosity reduction of SPI-1 is 1.26 dL/g at 31° C. when the polymer concentration in DMSO is 0.5 g/dL.

Example 3

Synthesis of sulfonated polyimide (SPI-2) in triethylammonium salt form

SPI-2 was synthesized in the same manner as in Example 2 except that the molar ratio of BAPFDS to DDBT was controlled to 1:2. The viscosity reduction of SPI-2 is 1.62 dL/g at 31° C. when the polymer concentration in DMSO is 0.5 g/dL.

Example 4

Synthesis of sulfonated polyimide (SPI-3) in triethylammonium salt form

SPI-3 was synthesized in the same manner as in Example 2 except that the molar ratio of BAPFDS to DDBT was controlled to 2:1. The viscosity reduction of SPI-3 is 1.34 dL/g at 31° C. when the polymer concentration in DMSO is 0.5 g/dL.

Example 5

Synthesis of sulfonated polyimide (SPI-4) in triethylammonium salt form

SPI-4 was synthesized in the same manner as in Example 2 except that BTFBz was used as a non-sulfonated diamine instead of DDBT and the molar ratio of BAPFDS to BTFBz was controlled to 1:1. The viscosity reduction of SPI-4 is 2.12 dL/g at 31° C. when the polymer concentration in DMSO is 0.5 g/dL.

Example 6

(Formation of Sulfonated Polyimide Membrane)

The sulfonated polyimides synthesized in Examples 2 to 5 were each dissolved in NMP, affording 5% homogeneous solutions. The resulting polymer solution was cast on a glass plate and the NMP was evaporated at 80° C. for 6 hours. The resulting cast film was peeled off from the glass plate, immersed in methanol to completely remove residual NMP, and finally dried in a vacuum oven at 120° C. for 10 hours, affording a sulfonated polyimide membrane. The resulting sulfonated polyimide membrane is in a triethylammonium salt form.

Example 7

(Proton Exchange)

Each of the sulfonated polyimide membranes in the form of a triethylammonium salt was immersed in a 0.1 M aqueous hydrochloric acid solution at room temperature for a 24 hours in total, thereby being converted completely into a proton form. Each of the membranes was taken out and washed thoroughly with deionized water, and thus a trace amount of the residual free acid was removed. The membrane was then dried at 120° C. for 10 hours.

Example 8

(Metal Cation Exchange)

Sulfonated polyimide membranes in the proton form were immersed in 0.1 M aqueous salt solutions (LiCl, NaCl, KCl, $CaCl_2$, $Al(NO_3)_3$) at room temperature for 24 hours, and the membranes were confirmed to have been converted thoroughly into a metal cation form. Each of the membranes was taken out and washed thoroughly with deionized water, and thus a trace amount of the residual free salt was removed. The membrane was then dried at 120° C. for 10 hours.

[Ft-Ir Spectrum]

FIG. 5 shows FT-IR spectra of the SPI-1 membranes of the present invention in various cation forms ($H^+$, $Li^+$, Nat, $K^+$, $Mg^{2+}$, $Ca^{2+}$, $Al^{3+}$). The very broad band around 3400 $cm^{-1}$ is due to water absorbed in the membrane. On the basis of the characteristic absorption bands at 1710 $cm^{-1}$ (C=O asymmetric stretch), 1668 $cm^{-1}$ (C=O symmetric stretch) and 1342 $cm^{-1}$ (C—N stretch), the formation of a 6-membered imide ring was confirmed. The characteristic absorption bands at 1095 $cm^{-1}$ (S=O asymmetric stretch) and 1030 $cm^{-1}$ (S=O symmetric stretch) are due to sulfonic acid groups. From FIG. 5, it can be seen that the spectra are identical for different metal cations, except for a slight difference in intensity at the broad band around 3400 $cm^{-1}$.

Example 9

(Gas Separation Performance)

The permeability coefficient and the selectivity of the sulfonated polyimide membranes in a proton form or a metal cation form at 35° C. and 0.1 MPa (upstream pressure) are shown in Table 1.

TABLE 1

| Film | Cation | Permeability coefficient (unit: Barrer) $CO_2$ | $O_2$ | $N_2$ | $CH_4$ | Selectivity (—) $CO_2/N_2$ | $CO_2/CH_4$ | $O_2/N_2$ |
|---|---|---|---|---|---|---|---|---|
| SPI-1 | $Al^{3+}$ | 320 | 46.2 | 7.07 | 9.31 | 45.3 | 34.4 | 6.53 |
| | $Ca^{2+}$ | 141 | 19.1 | 3.03 | 2.92 | 46.5 | 48.3 | 6.63 |
| | $Mg^{2+}$ | 96.3 | 15.8 | 2.63 | 2.03 | 36.6 | 47.4 | 6.01 |
| | $K^+$ | 136 | 17.1 | 3.62 | 7.08 | 37.6 | 49.5 | 4.72 |
| | $Na^+$ | 131 | 18.3 | 3.56 | 6.55 | 36.8 | 52 | 5.14 |
| | $Li^+$ | 100 | 11.9 | 2.23 | 1.78 | 44.8 | 56.2 | 5.34 |
| | $H^+$ | 247 | 37 | 8.10 | 7.00 | 30.5 | 35.3 | 4.57 |
| SPI-2 | $Al^{3+}$ | 461 | 74.3 | 14.3 | 12.8 | 32.2 | 36.0 | 5.20 |
| | $Ca^{2+}$ | 280 | 41.5 | 8.74 | 8.30 | 32.0 | 33.7 | 4.75 |
| | $K^+$ | 373 | 45.8 | 10.5 | 10.5 | 34.2 | 35.5 | 4.20 |
| | $Li^+$ | 188 | 25.8 | 5.58 | 4.46 | 33.7 | 42.2 | 4.62 |
| SPI-3 | $Ca^{2+}$ | 94.3 | 11.4 | 2.00 | 1.59 | 47.2 | 59.3 | 5.70 |
| | $K^+$ | 87.6 | 9.53 | 1.77 | 1.51 | 49.5 | 58.0 | 5.38 |
| | $Na^+$ | 86.5 | 11.0 | 1.32 | 1.29 | 65.5 | 67.1 | 8.33 |
| SPI-4 | $H^+$ | 180 | 28.4 | 5.87 | 5.30 | 30.7 | 34.0 | 4.84 |

1 Barrer = $10^{-10}$ $cm^3$ (STP) $cm^{-1}$ $s^{-1}$ $cmHg^{-1}$

Comparative Example 1

The 5-membered ring sulfonated polyimide reported by Y. K. Kim et al. has a chemical structure represented by the following general formula (2) (Y. K. Kim et al., J. Membr. Sci., 226 (2003) 145-158).

TABLE 2

Gas permeabilities and selectivities of the M-SPI precursors at 25° C.

| M-SPI precursors | Permeability (Barrer[a]) He | $O_2$ | $N_2$ | Selectivity $He/N_2$ | $O_2/N_2$ |
|---|---|---|---|---|---|
| H-SPI 1091 | 13.12 | 0.56 | 0.06 | 219 | 9.3 |
| Li-SPI 1091 | 14.51 | 0.93 | 0.17 | 85.4 | 5.5 |
| Na-SPI 1091 | 16.49 | 1.24 | 0.23 | 71.7 | 5.4 |
| K-SPI 1091 | 18.63 | 1.36 | 0.27 | 69.0 | 5.0 |
| Li-SPI 1082 | 17.20 | 1.22 | 0.49 | 35.1 | 2.5 |
| Na-SPI 1082 | 19.57 | 1.49 | 0.70 | 27.9 | 2.1 |
| K-SPI 1082 | 22.23 | 1.61 | 0.98 | 22.7 | 1.6 |

[a]Barrer = 1 × $10^{-10}$ $cm^3$ (STP) $cm/cm^2$ s cmHg.

Note: The membrane H-SPI 1091 is a proton-type sulfonated polyimide, and the molar ratio of m-phenylenediamine to 2,2'-benzidine disulfonic acid is 9:1. The membrane K-SPI 1082 is a potassium cation-type sulfonated polyimide, and the molar ratio of m-phenylenediamine to 2,2'-benzidine disulfonic acid is 8:2.

The 5-membered ring sulfonated polyimide membrane in a cation form shows a very low oxygen permeability coefficient and only moderate or very low $O_2/N_2$ selectivity. H-SPI 1091 is the only one with high $O_2/N_2$ selectivity (9.3) but the oxygen permeability coefficient thereof is lowest (0.56 Barrer). Furthermore, the metal cation exchange treat-

[Formula 8]

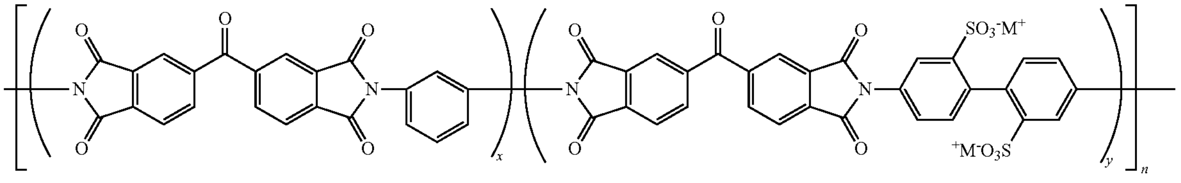

$M^+ = H^+, Li^+, Na^+, K^+$ (2)

The sulfonated polyimide is synthesized via random condensation polymerization of 3,3',4,4'-benzophenone tetracarboxylic dianhydride, 2,2'-benzidine disulfonic acid, and m-phenylenediamine. The molar ratio of m-phenylenediamine to 2,2'-benzidine disulfonic acid is controlled to 9:1 and 8:2. For $He/N_2$ and $O_2/N_2$, the separation performance of sulfonated polyimide membranes of proton type, lithium cation type, sodium cation type, and potassium cation type has been reported, and the data are shown in Table 2. To our knowledge, the document cited above is almost the only publication that reports the effect of various metal cations on the gas separation performance of sulfonated polyimide membranes. In the document, Y. K. Kim et al. report that 5-membered sulfonated polyimide membranes synthesized from 3,3',4,4'-benzophenone tetracarboxylic dianhydride, 2,2'-benzidine disulfonic acid, and m-phenylenediamine have considerably high selectivity for $O_2/N_2$ and $He/N_2$ gas pairs in a proton form, but their permeability coefficients of $O_2$ and He are very low. Furthermore, it has been reported that the selectivity was significantly reduced when the membranes were converted into a metal cation form ($Li^+$, $Na^+$, and $K^+$).

ment significantly reduces the selectivity. The $O_2/N_2$ separation performance of the present invention is clearly much better than that of the 5-membered sulfonated polyimide membrane reported by Y. K. Kim et al.

Comparative Example 2

Chemical structures of 6-membered ring sulfonated polyimides reported by K. Tanaka et al. (K. Tanaka et al., Polymer 47 (2006) 4370-4377) and the corresponding non-sulfonated polyimide membrane are shown below. The polyimides are synthesized from 1,4,5,8-naphthalenetetracarboxylic dianhydride (NTDA) and 2,2-bis(4-(4-aminophenoxy)-3-sulfophenyl) hexafluoropropane (BAPHFDS), and the non-sulfonated product is synthesized from NTDA and 2,2-bis(4-(4-aminophenoxy)) hexafluoropropane (BAPHF). For $H_2/CH_4$, $CO_2/N_2$, and $O_2/N_2$, the separation performance (1 atm, 35° C.) of both triethylammonium salt-type and proton-type sulfonated polyimide membranes and the corresponding non-sulfonated polyimide membrane has been reported, and the data are shown in Table 3. Data for metal cation exchange membranes are not reported.

[Formula 9]

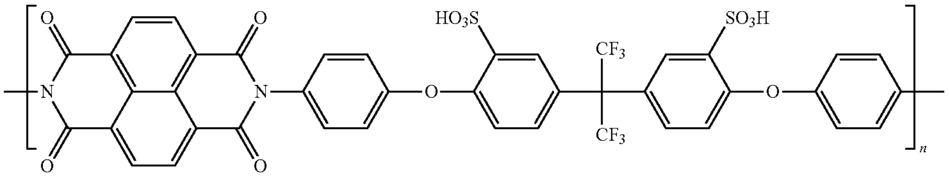

NTDA-BAPHFDS(H)

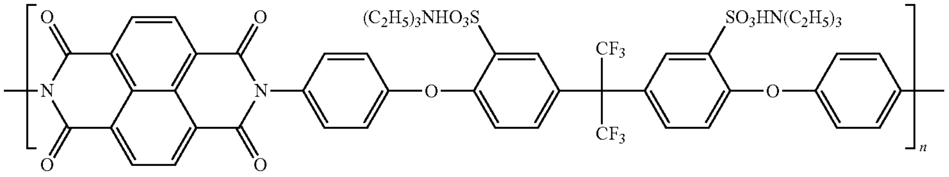

NTDA-BAPHFDS(A)

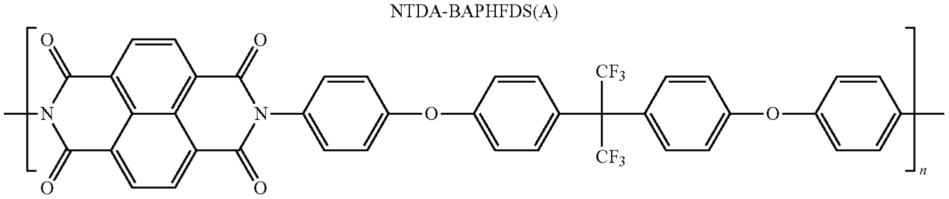

NTDA-BAPHF

TABLE 3

| | Permeability coefficient P $(10^{-10}$ cm$^3$ (STP) cm/(cm$^2$ s cmHg)) | | | | | Selectivity | | |
|---|---|---|---|---|---|---|---|---|
| | $H_2$ | $CO_2$ | $O_2$ | $N_2$ | $CH_4$ | $P_{H_2}/P_{CH_4}$ | $P_{CO_2}/P_{N_2}$ | $P_{O_2}/P_{N_2}$ |
| BAPHF | 50 | 21 | 4.4 | 0.72 | 0.48 | 100 | 29 | 6.1 |
| BAPHFDS (H) | 52 | 13 | 2.8 | 0.37 | 0.16 | 330 | 36 | 7.8 |
| BAPHFDS (A) | 29 | 14 | 2.3 | 0.42 | 0.40 | 72 | 34 | 5.5 |

The membranes reported by K. Tanaka et al. show moderately high selectivity for $H_2/CH_4$, $CO_2/N_2$, and $O_2/N_2$, but show considerably low permeability coefficients of $CO_2$ and $O_2$, indicating much lower separation performance than the present invention.

INDUSTRIAL APPLICABILITY

The gas separation membrane of the present invention can be used as a separation membrane that allows a specific gas to permeate therethrough, separating the gas from a mixed gas.

The invention claimed is:

1. A gas separation membrane comprising a sulfonated polyimide represented by the following general formula (1):

[Formula 1]

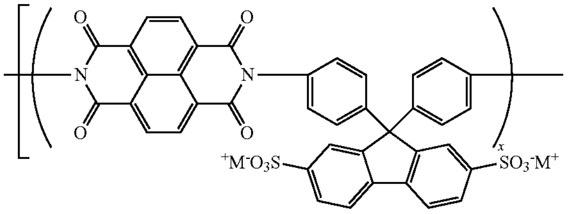

(1)

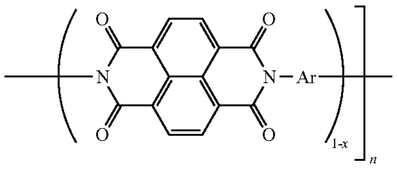

wherein Ar is an aryl group, X is more than 0 and less than 1, and $M^+$ is $H^+$ or a metal cation, and the aryl group is represented by the following chemical formula (2)

(2)

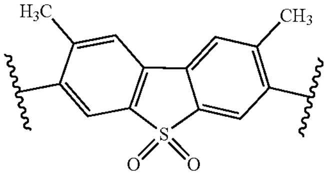

2. The gas separation membrane according to claim 1, wherein the metal cation is a mono- to tri-valent metal cation.

3. The gas separation membrane according to claim 1, wherein the $M^+$ is a di- to tri-valent metal cation.

* * * * *